(12) United States Patent
Lee et al.

(10) Patent No.: US 11,288,546 B2
(45) Date of Patent: Mar. 29, 2022

(54) APPARATUS AND METHOD FOR TRAINING FACIAL LOCALITY SUPER RESOLUTION DEEP NEURAL NETWORK

(71) Applicants: Seoul National University R&DB Foundation, Seoul (KR); hodooAI Lab Inc., Seoul (KR)

(72) Inventors: Jungwoo Lee, Seoul (KR); Kihun Kim, Seoul (KR)

(73) Assignees: Seoul National University R&DB Foundation, Seoul (KR); hodooAI Lab Inc., Seoul (KR)

( * ) Notice: Subject to any disclaimer, the term of this patent is extended or adjusted under 35 U.S.C. 154(b) by 41 days.

(21) Appl. No.: 16/427,358

(22) Filed: May 31, 2019

(65) Prior Publication Data

US 2019/0370608 A1    Dec. 5, 2019

(30) Foreign Application Priority Data

May 31, 2018 (KR) ........................ 10-2018-0063015

(51) Int. Cl.
*G06K 9/00* (2022.01)
*G06K 9/62* (2022.01)
(Continued)

(52) U.S. Cl.
CPC ......... *G06K 9/6262* (2013.01); *G06K 9/6257* (2013.01); *G06N 3/08* (2013.01); *G06T 3/4053* (2013.01); *G06V 40/161* (2022.01)

(58) Field of Classification Search
CPC ............ G06K 9/00228; G06K 9/6257; G06K 9/6262; G06N 3/0454; G06N 3/0472;
(Continued)

(56) References Cited

U.S. PATENT DOCUMENTS 9,741,107 B2    8/2017 Xu et al.
9,785,855 B2 * 10/2017 Gordo Soldevila ... G06K 9/325
(Continued)

FOREIGN PATENT DOCUMENTS

EP          3182334 A1    6/2017
KR    10-2016-0131848 A   11/2016
(Continued)

OTHER PUBLICATIONS

Shrivastava, Ashish, et al. "Learning from simulated and unsupervised images through adversarial training." Proceedings of the IEEE conference on computer vision and pattern recognition. 2017. (Year: 2017).*

(Continued)

*Primary Examiner* — Hadi Akhavannik
(74) *Attorney, Agent, or Firm* — Insight Law Group, PLLC; Seung Lee

(57) ABSTRACT

Provided is an apparatus for training a facial-locality super resolution deep neural network, the apparatus including a generator configured to receive a low-resolution image and convert the received low-resolution image into a fake high-resolution image similar to an original high-resolution image, a discriminator configured to compare the fake high-resolution image output from the generator with the original high-resolution image to determine authenticity, and a facial-locality loss term configured to calculate a loss that is to be minimized by the generator according to the authenticity output from the discriminator, wherein the generator is an artificial neural network learning model that learns while adjusting a weight to minimize the loss, and the facial-locality loss term calculates the loss of the generator by reflecting pixel information about a feature region of a face.

9 Claims, 8 Drawing Sheets

(51) Int. Cl.
  *G06N 3/08* (2006.01)
  *G06T 3/40* (2006.01)
  *G06V 40/16* (2022.01)

(58) Field of Classification Search
  CPC .......... G06N 3/08; G06N 3/084; G06N 3/088; G06T 11/00; G06T 5/00
  See application file for complete search history.

(56) References Cited

U.S. PATENT DOCUMENTS

| | | | |
|---|---|---|---|
| 9,940,539 B2 | 4/2018 | Han et al. | |
| 10,871,536 B2 | 12/2020 | Golden et al. | |
| 2016/0379352 A1* | 12/2016 | Zhang | G06N 3/04 |
| | | | 382/157 |
| 2017/0177965 A1* | 6/2017 | Gordo Soldevila | G06K 9/4628 |
| 2018/0075581 A1* | 3/2018 | Shi | G06N 3/0472 |
| 2018/0293706 A1* | 10/2018 | Viswanathan | G06T 3/4053 |
| 2019/0197358 A1* | 6/2019 | Madani | G06N 3/0481 |
| 2019/0295302 A1* | 9/2019 | Fu | G06K 9/6262 |
| 2019/0370608 A1* | 12/2019 | Lee | G06T 3/4053 |
| 2020/0021873 A1* | 1/2020 | Swaminathan | G06Q 30/0242 |
| 2020/0097554 A1* | 3/2020 | Rezagholizadeh | G06N 3/0454 |
| 2020/0125954 A1* | 4/2020 | Truong | G06N 3/0454 |

FOREIGN PATENT DOCUMENTS

| | | |
|---|---|---|
| KR | 10-2018-0004208 A | 1/2018 |
| WO | 2017-091833 A1 | 6/2017 |

OTHER PUBLICATIONS

Bin, Huang, et al. "High-quality face image SR using conditional generative adversarial networks." arXiv preprint arXiv: 1707.00737 (2017). (Year: 2017).*

Ledig, Christian, et al. "Photo-realistic single image super-resolution using a generative adversarial network." Proceedings of the IEEE conference on computer vision and pattern recognition. 2017. (Year: 2017).*

Gatys, Leon, Alexander S. Ecker, and Matthias Bethge. "Texture synthesis using convolutional neural networks." Advances in neural information processing systems 28 (2015): 262-270. (Year: 2015).*

Ashish Shrivastava et al: "Learning from Simulated and Unsupervised Images through Adversarial Training", Dec. 22, 2016.

Huang Bin et al: "High-Quality Face Image SR Using Conditional Generative Adversarial Networks", Jul. 4, 2017.

Korean office action dated Apr. 25, 2020 for Korean Application No. 10-2018-0063015.

Ledig, Christian, et al. Photo-realistic single image super-resolution using a generative adversarial network. Proceedings of the IEEE conference on computer vision and pattern recognition. 2017.

Extended Search Report dated Nov. 25, 2021 for European Application No. 17177701.0.

* cited by examiner

FIG. 4

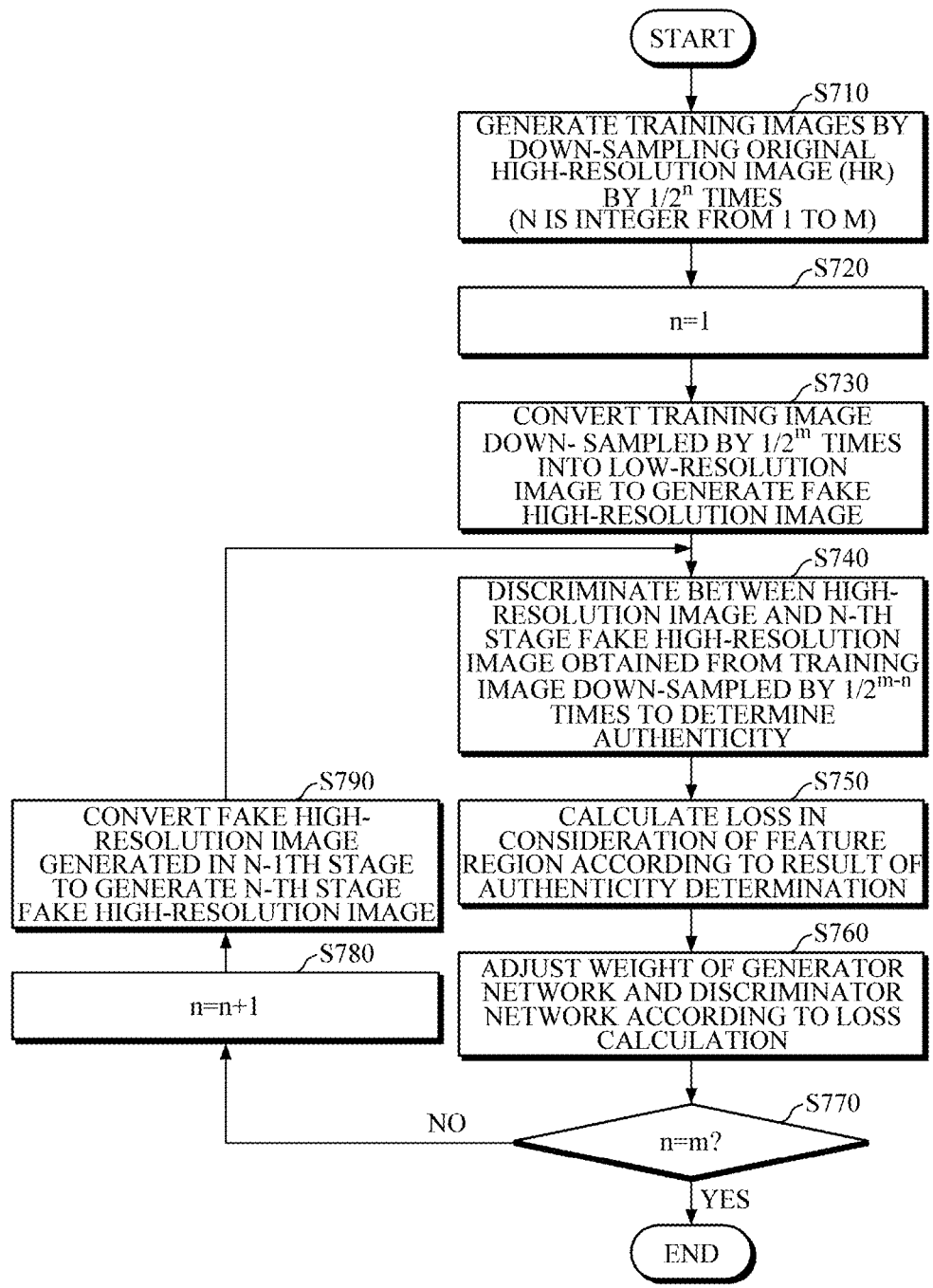

APPARATUS AND METHOD FOR TRAINING FACIAL LOCALITY SUPER RESOLUTION DEEP NEURAL NETWORK

CROSS-REFERENCE TO RELATED APPLICATION

This application claims priority to and the benefit of Korean Patent Application No. 10-2018-0063015, filed on May 31, 2018, the disclosure of which is incorporated herein by reference in its entirety.

BACKGROUND

1. Field of the Invention

The present invention relates to a technology of deep learning, and more specifically, to an apparatus and method for training a deep neural network capable of performing image conversion using a generative adversarial network (GAN).

2. Discussion of Related Art

Recently, deep learning has been used in various fields of artificial intelligence, such as image classification, speech recognition, and the like. Such development is realized by deep neural networks effectively learning complex probability distributions through backpropagation.

In particular, the emergence of generative adversarial network (GAN) has allowed sophisticated learning on the probability distributions of training data. In other words, the generative models have allowed imitation and reproduction of higher-level data distributions, and thus have come into wide use in various fields, such as image, artificial speech, inpainting, and the like. Accordingly, there have been studies conducted on a deep learning model that enables single-image super-resolution to convert a low-resolution image into a high-resolution image.

However, most scientific treatises are obtaining the research results by learning CelebA, which is a famous dataset of images of celebrities, and CIFAR-10 and CIFAR-100, which are data sets constituted of 60,000 32×32 images. Accordingly, the generated learning model has a low regularization, and the number of pixels of training data is reduced so that the learning performance is significantly lowered.

SUMMARY OF THE INVENTION

The present invention is directed to providing an apparatus and method for training a facial-locality super resolution deep neural network which is capable of outputting a high-performance result by being specialized in facial images commonly captured by people.

The technical objectives of the present invention are not limited to the above, and other objectives may become apparent to those of ordinary skill in the art based on the following descriptions.

According to an aspect of the present invention, there is provided an apparatus for training a facial-locality super resolution deep neural network, the apparatus including a generator configured to receive a synthetic low-resolution image and convert the received synthetic image into a fake high-resolution image similar to an original high-resolution image, a discriminator configured to compare the fake high-resolution image output from the generator with the original high-resolution image to determine authenticity, and a facial-locality loss term configured to calculate a loss that is to be minimized by the generator according to the authenticity output from the discriminator, wherein the generator is an artificial neural network learning model that learns while adjusting a weight to minimize the loss, and the facial-locality loss term calculates the loss of the generator by reflecting pixel information about a feature region of a face.

The apparatus may further include a plurality of training data generators that are cascaded and configured to generate training images that are down-sampled from the original high-resolution image by a factor of $½^n$ (n is an integer from 1 to m), wherein the training data generator is configured to input a training image down-sampled by $½^m$ times to a first generator as a low-resolution image and input a training image down-sampled by $½^{m-n}$ times to a $n^{th}$ discriminator as a high-resolution image.

The training data generator may use average pooling and a random sigma Gaussian filter.

The facial-locality loss term may reflect, in a loss of the generator, $L_{vgg}$ ij that refers to a $j^{th}$ layer of an $i^{th}$ block of a visual geometry group (VGG) network, wherein (i, j) is at least one of (2, 2), (4, 4), and (5, 4).

The facial-locality loss term may be configured to calculate a gradient loss that is a value corresponding to a norm of differences between lateral direction pixels, diagonal direction pixels, and longitudinal direction pixels at each pixel of an image and obtained by performing a root mean square on instantaneous gradient values of pixels of the image and reflect the gradient loss in the loss of the generator.

According to another aspect of the present invention, there is provided a method of training a facial-locality super resolution deep neural network, the method including receiving a synthetic low-resolution image and converting the received synthetic image into a fake high-resolution image similar to an original high-resolution image, comparing the fake high-resolution image with the original high-resolution image to determine authenticity, and calculating a loss, which is to be minimized in the converting, according to the authenticity, wherein the converting includes learning while adjusting a weight of an artificial neural network model to minimize the loss, and the calculating includes calculating the loss by reflecting pixel information about a feature region of a face.

According to another aspect of the present invention, there is provided a method of training a facial-locality super resolution deep neural network, the method including generating training images that are down-sampled from an original high-resolution image by $½^n$ times (n is an integer from 1 to m), setting a current stage (n) to a first stage, and converting a training image down-sampled by $½^m$ times into a low-resolution image to generate a first fake high-resolution image, discriminating between a high-resolution image and a $n^{th}$ high-resolution image, which is from a training image down-sampled by $½^{m-n}$ times to determine an authenticity, calculating a loss according to a result of the determination of the authenticity; relearning while updating a weight in a backpropagation method to minimize a loss of an artificial neural network learning model used in the generating according to the calculated loss, determining whether the current stage (n) coincides with m, and updating n to n+1 when the current stage (n) does not coincide with m, converting a fake high-resolution image generated in an $n-1^{th}$ stage to generate an $n^{th}$ stage fake high-resolution image, and sequentially repeating the discriminating, the calculating, the relearning, and the determining.

The calculating may include calculating the loss by reflecting pixel information about a feature region of a face.

BRIEF DESCRIPTION OF THE DRAWINGS

FIG. 4 is a diagram illustrating an example of a facial-locality map according to the present invention.

FIG. 8 is a flowchart showing a method of training a facial-locality super resolution deep neural network according to another embodiment of the present invention.

DETAILED DESCRIPTION OF EXEMPLARY EMBODIMENTS

Figure 1:
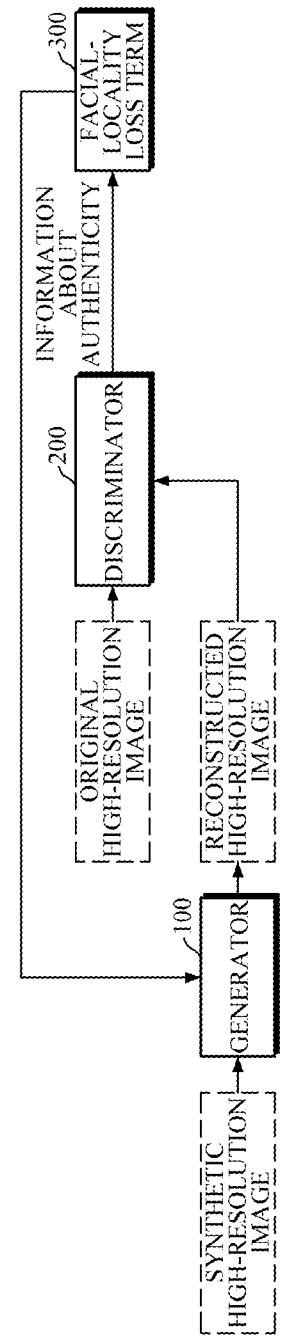
FIG. 1 is a block diagram illustrating an apparatus for training a facial-locality super resolution deep neural network according to an embodiment of the present invention.

Hereinafter, advantages and features of the present invention and manners of achieving them will become readily apparent with reference to descriptions of the following detailed embodiments when considered in conjunction with the accompanying drawings. The same reference numerals are used to designate the same elements through the whole specification.

It should be understood that, although the terms "first," "second," etc. may be used herein to describe various elements, these elements are not limited by these terms. These terms are only used to distinguish one element from another. It is to be understood that the singular forms "a," "an," and "the" include plural referents unless the context clearly dictates otherwise. The term "comprises" or "includes" and/or "comprising" or "including" means that one or more other components may further be not excluded unless context dictates otherwise. In the specification, the term "part" or "module" refers to a unit for processing at least one function or operation that may be implemented in hardware, software, or a combination thereof.

Figure 2:
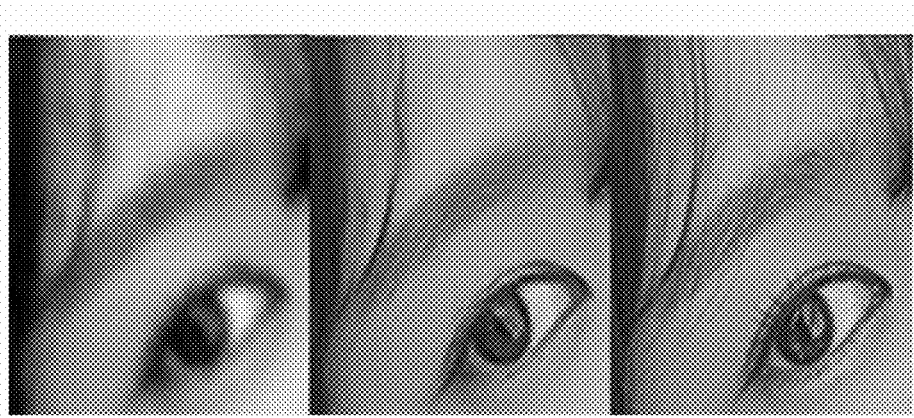
FIG. 2 is a diagram illustrating an example of a low-resolution image, an output image, and an original image according to the present invention.

FIG. 1 is a block diagram illustrating an apparatus for training a facial-locality super resolution deep neural network according to an embodiment of the present invention, and FIG. 2 is a diagram illustrating an example of a low-resolution image, an output image, and an original image according to the present invention.

Referring to FIG. 1, the apparatus for training a facial-locality super resolution deep neural network uses a generative adversarial network (GAN) that is broadly divided into a generator 100, a discriminator 200, and a facial-locality loss term 300.

In the GAN, the generator 100 and the discriminator 200 are alternately trained, and have roles similar to those of a counterfeit bill maker and a police officer, respectively. In other words, as criminals manufacture counterfeit bills and police officers determine whether bills are counterfeit or not, the criminals are caused to precisely manufacture counterfeit bills to prevent the police officers from discriminating the counterfeit bills, and the police officers are caused to more precisely detect the counterfeit bills. As a result, criminals may generate counterfeit bills that are not discernable by the general public.

As such, the generator 100 is trained such that the difference between an original high-resolution image and a fake high-resolution image is minimized, and the discriminator 200 is trained to distinguish the fake high-resolution image from the original high-resolution image. As a result, the generator 100 is trained to more sophisticatedly counterfeit a high-resolution image that may not discriminated by the discriminator 200.

The generator 100 is an artificial neural network learning model that reconstructs a synthetic low-resolution image as shown in FIG. 2A to generate a fake high-resolution image as shown in FIG. 2B that is similar to an original high-resolution image as shown in FIG. 2C. That is, the generator 100 is trained to generate a fake high-resolution image that may trick the discriminator 200.

The discriminator 200 compares the fake high-resolution image as shown in FIG. 2B produced by the generator 100 with the original high-resolution image as shown in FIG. 2C, determines an authenticity (real/fake), and outputs a result of the determination. The discriminator 200 is retrained to predict the original high-resolution image and the fake high-resolution image generated by the generator 100 with correct labels.

Through the learning process as such, the discriminator 200 is improved in performance of discerning falsification of a fake high-resolution image so that the generator 100 is improved in performance of implementing a fake high-resolution image which is more similar to the original high-resolution image so as to not be discriminated by the discriminator 200.

The facial-locality loss term 300 calculates a loss according to the authenticity output from the discriminator 200 and transmits the loss to the generator 100. Then, the generator 100 is trained while updating a weight of the artificial neural network in a backpropagation method to minimize a loss. In this case, according to the embodiment of the present invention, the facial-locality loss term 300 may store pixel information about feature regions, such as the eyes, nose, mouth, eyebrows, and jaw of a face in advance and reflect the pixel information of the feature regions in the loss calculation such that the feature regions are more sophisticatedly represented compared to other regions.

Figure 3:
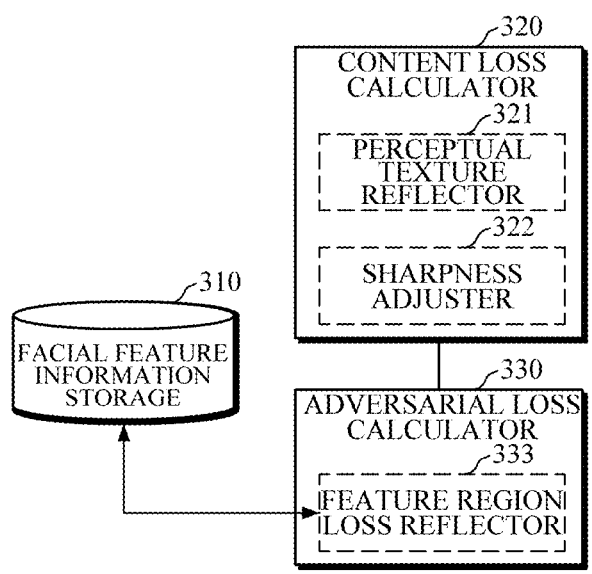
FIG. 3 is a detailed block diagram illustrating a facial-locality loss term according to an embodiment of the present invention.
Figure 4:
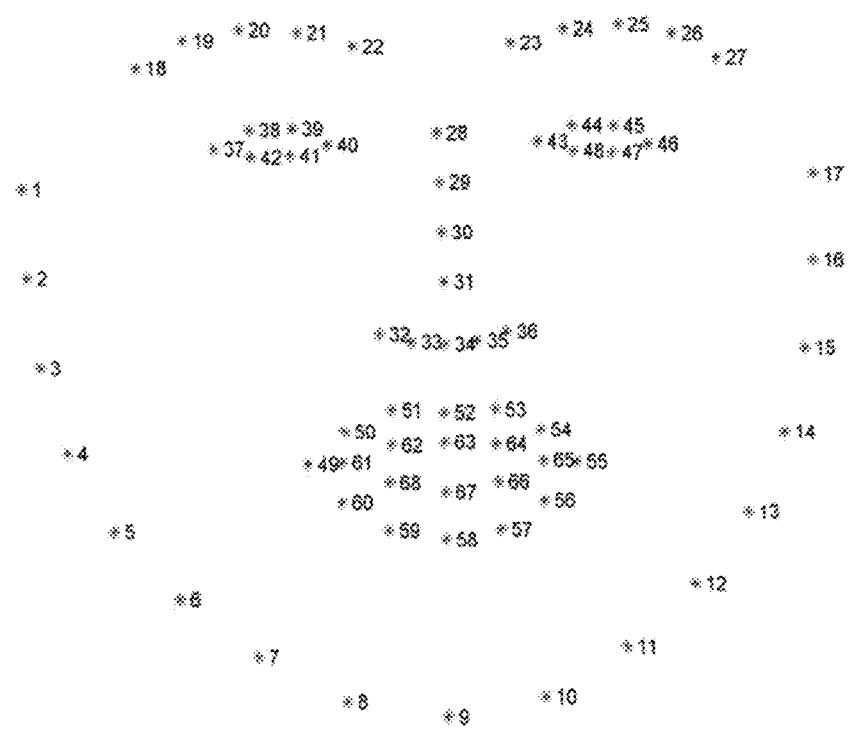

FIG. 3 is a detailed block diagram illustrating the facial-locality loss term according to the embodiment of the present invention, and FIG. 4 is a diagram illustrating an example of a facial-locality map according to the present invention.

Referring to FIG. 3, the facial-locality loss term 300 includes a facial feature information storage 310, a content loss calculator 320, and an adversarial loss calculator 330.

That is, the facial-locality loss term 300 calculates a loss $L_{generator}$ that is to be minimized through learning by the generator 100 according to Equation 1 below.

$$L_{generator} = L_{cnt} + L_{adv} \qquad \text{[Equation 1]}$$

In Equation 1, a content loss $L_{ent}$ is calculated by the content loss calculator 320 and is provided to implement a maximum similarity to perceptual elements of an item content of a targeted image, and an adversarial loss $L_{adv}$ is calculated by the adversarial loss calculator 330 and is provided to learn a probability distribution of each pixel of a targeted image to implement the learned probability distribution so that a more plausible high-resolution image is reconstructed.

The content loss calculator 320 calculates the content loss $L_{cnt}$ using Equations 2 to 5 below, and the adversarial loss calculator 330 calculates the adversarial loss $L_{adv}$ using Equations 6 and 7 below.

$$L_{cnt}=L_2+L_{vgg22}+L_{vgg44}+L_{vgg54}+L_g+L_w \quad \text{[Equation 2]}$$

Referring to Equation 2, $L_2$ is a root mean square (RMS) of a pixel value difference between a high-resolution image HR and an image generated by the generator 100 from a low-resolution image LR and is an item commonly used in the classical methods as the simplest item to compare the difference between two images. $L_2$ is calculated as in Equation 3 below.

$$L_2 = \frac{1}{r^2 WH}\sum_{x=1}^{rW}\sum_{y=1}^{rH}\left(I_{x,y}^{HR} - G_{\theta_G}(I^{LR})_{x,y}\right)^2. \quad \text{[Equation 3]}$$

According to the embodiment of the present invention, the content loss calculator 320 may include a perceptual texture reflector 321. That is, the perceptual texture reflector 321 calculates vgg Loss items $L_{vgg}$ corresponding to perceptual textures, as in Equation 4 below.

$$L_{vgg} = \frac{1}{WH}\sum_{x=1}^{W}\sum_{y=1}^{H}\left(\varphi(I^{HR})_{x,y} - \varphi(G_{\theta_G}(I^{LR}))_{x,y}\right)^2. \quad \text{[Equation 4]}$$

In Equation 2, the numbers 22, 44, and 54 denoted after vgg of $L_{vgg}$ in Equation 2 represent a $j^{th}$ layer of an $i^{th}$ block in a VGG network. That is, vgg22 represents using a result value of the second layer of the second block of a vgg network. According to a thesis (Gatys, Leon, Alexander S. Ecker, and Matthias Bethge. "Texture synthesis using convolutional neural networks." Advances in Neural Information Processing Systems, 2015), intermediate result vales of layers of each block effectively show the characteristics of a perceptual texture having a particular size. Accordingly, the present invention allows a degree of detail and sophistication, such as in a high-resolution image, to be perceived through the perceptual textures using the perceptual texture reflector 321.

In addition, according to the embodiment of the present invention, the content loss calculator 320 may further include a sharpness adjuster 322. In other words, the sharpness adjuster 322 calculates a gradient loss $L_g$ as shown in Equation 5 below to implement similarity in the instantaneous degree of change at each pixel of an image and adjusts to match the sharpness between a fake high-resolution image and an original high-resolution image.

$$L_g = \frac{1}{WH}\sum_{x=1}^{W}\sum_{y=1}^{H}\left(g(I^{HR})_{x,y} - g(G_{\theta_G}(I^{LR}))_{x,y}\right)^2, \quad \text{[Equation 5]}$$

$L_w$: weight decay loss

In Equation 5, the gradient loss $L_g$ is a value obtained by performing a root mean square on instantaneous gradient values for pixels of an image with a norm of differences between lateral direction pixels, diagonal direction pixels, and longitudinal direction pixels at each pixel. In addition, a weight decaying Lw is a loss commonly used in the deep learning network allowing the learning toward the change of weight parameters of models to be minimized and thus enabling the model learning to be more stable.

Meanwhile, the adversarial loss calculator 330 calculates the adversarial loss $L_{adv}$ through Equation 6 below.

$$L_{adv} = \sum_{n=1}^{N} -\log D_{\theta_D}(G_{\theta_G}(I^{LR})) + L_{facial_{adv}}. \quad \text{[Equation 6]}$$

Through the adversarial loss $L_{adv}$ calculated in Equation 6, the weight is updated such that the discriminator 200 more precisely discriminates the original high-resolution image as 'one' and the fake high-resolution image as 'zero', and the generator 100 is trained to make the fake high-resolution image be imitated similar to the original high-resolution image so as to not be discriminated by the discriminator 200.

According to the embodiment of the present invention, the adversarial loss calculator 330 further includes a feature region loss reflector 333 such that set information of pixel values (x, y coordinates) corresponding to feature regions, such as the eyes, nose, mouth, jaw, and the like, is reflected in the adversarial loss value through a facial map stored in the facial feature information storage 310. A loss item $L_{facial\_adv}$ using the facial-locality is generated as shown in Equation 7 below and added.

$$L_{facial_{adv}} = \sum_{n=1}^{N}\sum_{x,y \in Facial\ Area} -\log D_{\theta_D}(G_{\theta_G}(I_{x,y}^{LR})) \quad \text{[Equation 7]}$$

That is, since the adversarial loss calculator 330 adds the adversarial loss of the pixels of the feature region to the adversarial loss value of the entire facial region, the characteristics of the feature regions, such as the eyes, nose, mouth, and the like, are better reflected to generate the fake high-resolution image.

Figure 5:
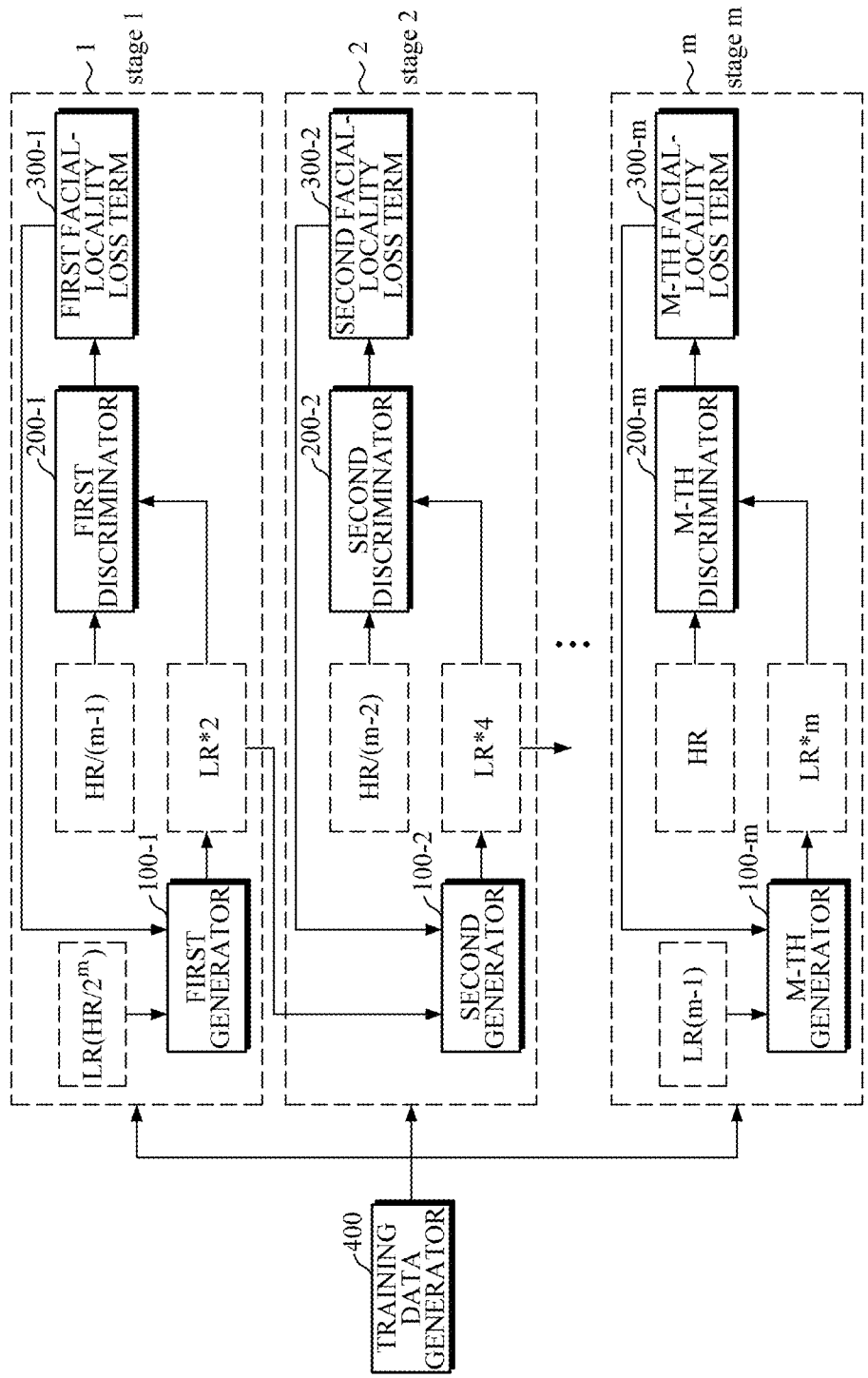
FIG. 5 is a block diagram illustrating an apparatus for training facial-locality super resolution deep neural network according to another embodiment of the present invention.

FIG. 5 is a block diagram illustrating an apparatus for training a facial-locality super resolution deep neural network according to another embodiment of the present invention.

Referring to FIG. 5, the apparatus for training a facial-locality super resolution deep neural network includes a plurality of sub-apparatuses for training a facial-locality super resolution deep neural network 1, 2, . . . , and m cascaded to form a first stage, a second stage, . . . , and an $m^{th}$ stage.

Since the sub-apparatuses for training a facial-locality super resolution deep neural network 1, 2, . . . , and m have the same configuration as that of the apparatuses for training a facial-locality super resolution deep neural network shown in FIG. 1, detailed description thereof will be omitted.

A first generator 100-1, a second generator 100-2, . . . , and an $m^{th}$ generator 100-$m$ each are configured to double the resolution of an image.

In addition, the apparatus for training a facial-locality super resolution deep neural network further includes a training data generator 400 and distributes training data to each generator 100-1, 100-2, . . . or 100-$m$ and each discriminator 200-1, 200-2, . . . or 200-$m$.

Figure 6:
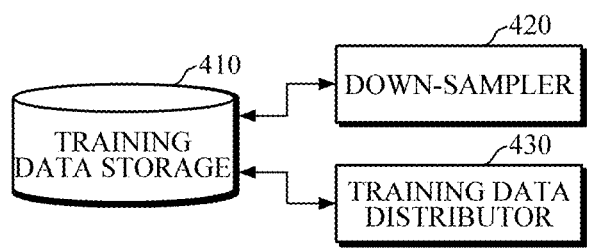
FIG. 6 is a block diagram illustrating a training data generator of the apparatus for training a facial-locality super resolution deep neural network according to another embodiment of the present invention.

FIG. 6 is a block diagram illustrating the training data generator of the apparatus for training a facial-locality super resolution deep neural network according to another embodiment of the present invention.

Referring to FIG. 6, the training data generator 400 includes a training data storage 410, a down-sampler 420, and a training data distributor 430.

The down-sampler 420 generates training images down-sampled by $\frac{1}{2}^n$ times (n is an integer from 1 to m) from an original high-resolution image HR and stores the generated training images in the training data storage 410. Here, the down-sampling may be performed using average pooling and a random sigma Gaussian filter. For example, when the number m of the sub-apparatuses for training a facial-locality super resolution deep neural network 1, 2, . . . , and m is three, the down-sampler 420 generates images HR/2, HR/4, and HR/8 down-sampled by ½ times, ¼ times, and ⅛ times, respectively.

Referring to FIG. 5, the training data distributor 430 of the training data generator 400 inputs the training image down-sampled by $\frac{1}{2}^m$ times to the first generator 100-1 as a low-resolution image and inputs the training image down-sampled by $\frac{1}{2}^{m-n}$ times to the $n^{th}$ discriminator 200-m as a high-resolution image.

For example, when the number m of the sub-apparatuses for training a facial-locality super resolution deep neural network 1, 2, . . . , and m is three, the first generator 100-1 receives an image HR/8 as a low-resolution image LR. Then, the first generator 100-1 outputs a fake high-resolution image having a resolution twice that of the low-resolution image LR, that is, an image corresponding to HR/4. Then, the first discriminator 200-1 receives training data corresponding to HR/4 as an original high-resolution image, receives the fake high-resolution image LR*2 output from the first generator 100-1, and determines whether the two images are identical to each other.

Next, the second generator 100-2 receives the fake high-resolution image LR*2 output from the first generator 100-1 as a low-resolution image. Then, the second generator 100-2 outputs a fake high-resolution image having a resolution twice that of the low-resolution image LR*2, that is, an image corresponding to HR/2. Then, the second discriminator 200-2 receives training data corresponding to HR/2 as an original high-resolution image, receives the fake high-resolution image LR*4 output from the second generator 100-2, and determines whether the two images are identical to each other.

Finally, the third generator 100-3 receives the fake high-resolution image LR*4 output from the second generator 100-2 as a low-resolution image. Then, the third generator 100-3 outputs a fake high-resolution image LR*8 having a resolution twice that of the image LR*4, that is, an image corresponding to HR. Then, the third discriminator 200-3 receives an original high-resolution image corresponding to HR, receives the fake high-resolution image LR*8 output from the third generator 100-3, and determines whether the two images are identical to each other.

In conclusion, according to the stepwise facial-locality super resolution image conversion learning model, the third generator 100-3 generates the fake high-resolution image LR*8, and the third discriminator 200-3 determines the authenticity of the fake high-resolution image LR*8 with respect to the original high-resolution image HR.

Generators which are currently used are provided to implement eightfold super resolution enhancement, and when the eightfold super resolution enhancement is performed at once, the learning amount may lead to the complexity of the learning model being significantly increased, thereby causing limitation in the learning stability and speed.

However, when the learning is performed in stages through the generator that implements double-super resolution using down-sampled training data, the learning stability and speed are ensured while improving the learning performance.

Figure 7:
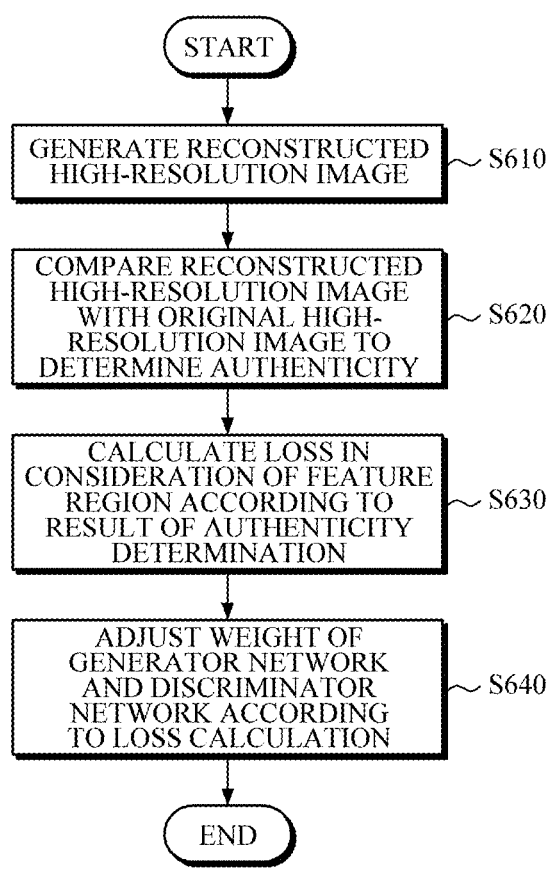
FIG. 7 is a flowchart showing a method of training a facial-locality super resolution deep neural network according to an embodiment of the present invention.

FIG. 7 is a flowchart showing a method of training a facial-locality super resolution deep neural network using a generative adversarial network (GAN) according to an embodiment of the present invention.

Referring to FIG. 7, the method of training a facial-locality super resolution deep neural network broadly includes receiving a synthetic low-resolution image and converting the received synthetic low-resolution image into a fake high-resolution image similar to an original high-resolution image (S610), determining authenticity by comparing the fake high-resolution image with the original high-resolution image (S620), and calculating a loss that is to be minimized in the converting according to the authenticity (S630).

Here, the converting S610 and the determining S620 are performed by the respective artificial neural network learning models, that is, the generator 100 and the discriminator 200 as shown in FIG. 1, and according to the loss calculated in operation S630, the converting S610 performs learning while updating the weight of the artificial neural network model in a backpropagation method to minimize a loss, and the determining S620 performs retraining such that the generated fake high-resolution image is predicted with a correct label (S640).

Through the learning process as such, the determining S620 has an improved performance in identifying falsification of a fake high-resolution image, and therefore the converting S610 has an improved performance in implementing a fake high-resolution image that is more similar to the original high-resolution image so as to not be identified in the discriminating S620.

In addition, according to the embodiment of the present invention, the calculating S630 is performed by the facial-locality loss term 300 through the above-described Equations 1 to 7, and pixel information about feature regions, such as the eyes, nose, mouth, eyebrows, and jaw of the face, is stored in advance and reflected in the loss calculation such that the feature regions are more sophisticatedly represented compared to other regions.

FIG. 8 is a flowchart showing a method of training a facial-locality super resolution deep neural network according to another embodiment of the present invention.

Referring to FIG. 8, the method of training facial locality super resolution deep neural network according to the embodiment includes performing the method of training a facial-locality super resolution deep neural network shown in FIG. 7 in multi-stages multiple times. That is, the method of training a facial-locality super resolution deep neural network according to the embodiment may be performed by the stagewise sub-apparatuses for training a facial-locality super resolution deep neural network included in the apparatus for training a facial-locality super resolution deep neural network shown in FIG. 5.

Referring to FIG. 8, the apparatus for training a facial-locality super resolution deep neural network generates training images that are down-sampled from an original high-resolution image HR by $\frac{1}{2}^n$ times (n is an integer from 1 to m, and m is the number of stages of the method of training a facial-locality super resolution deep neural network) (S710). Here, the down-sampling may be performed using average pooling and a random sigma Gaussian filter. For example, when the number m of sub-stages of the method of training a facial-locality super resolution deep neural network (1, 2, . . . , and m) is three, images HR/2, HR/4, and HR/8 down-sampled by ½ times, ¼ times, and ⅛ times, respectively, are generated.

Then, the apparatus for training a facial-locality super resolution deep neural network sets the current stage n to the first stage (S720) and converts the training image down-sampled by $½^m$ times into a low-resolution image to generate a first fake high-resolution image (S730).

Then, the apparatus for training a facial-locality super resolution deep neural network uses a training image down-sampled by $½^{m-n}$ times to discriminate between a high-resolution image and an n-th stage fake high-resolution image to determine the authenticity (S740).

Then, the apparatus for training a facial-locality super resolution deep neural network calculates a loss as a result of the authenticity determined in operation S740 (S750). In this case, the loss is calculated through the above-described Equations 1 to 7 according to the embodiment of the present invention. In particular, pixel information about feature regions, such as the eyes, nose, mouth, eyebrows, and jaw is stored in advance and is reflected in the loss calculation such that the feature region is more sophisticatedly represented compared to other regions.

Then, the apparatus for training a facial-locality super resolution deep neural network performs learning while updating the weight of the artificial neural network learning model used in operation S730 in a backpropagation method such that the loss of the artificial neural network learning model is minimized and performs retraining such that the fake high-resolution image generated by the artificial neural network learning model used in operation S740 is predicted with a correct label (S760).

At the same time, the apparatus for training a facial-locality super resolution deep neural network determines whether the current stage n is equal to the total number m of the stages (S770).

As a result of the determination in operation S770, when n is not equal to m, that is, when other operations to be performed remain, the apparatus for training a facial-locality super resolution deep neural network updates n to n+1 (S780) and converts a fake high-resolution image generated in the $n-1^{th}$ stage to generate an $n^{th}$ stage fake high-resolution image (S790). Then, operations S740 to S770 are repeated.

On the other hand, when n is equal to m as a result of the determination in operation S770, that is, when operations to be performed are all performed, the apparatus for training a facial-locality super resolution deep neural network terminates the learning method. According to the embodiment, super-resolution is greatly improved. In other words, although various super-resolution models have existed in the past, the super-resolution models concern a general image rather than a specific image. However, the present invention employs a model intensively trained for a face and, particularly, feature regions, such as the eyes, nose, and mouth, and a high-resolution output that is specific to a face is obtained. In other words, a human face is reconstructed with extremely high precision of a 4K level, as if captured with a Digital Single Lens Reflex (DSLR) camera.

Accordingly, unlike the conventional super resolution models, which have a limitation in being applied to general consumers due to mostly relying on particular datasets, the present invention has versatility in the facial-locality super resolution and provides a high degree of satisfaction so as to provide general consumers and companies with various applications.

In addition, unlike the general GAN, the present invention provides a more stable and effective learning process using stage loss term.

Meanwhile, the embodiments described herein may be embodied as computer-readable codes on a computer-readable recording medium. The computer-readable recording medium is any data storage device that can store data that can be thereafter read by a computer system.

Examples of the computer-readable recording medium include a read only memory (ROM), a read access memory (RAM), a compact disk (CD)-ROM, a magnetic tape, a floppy disk, an optical data storage, and the like. In addition, the computer-readable recording medium may be implemented in the form of a carrier wave (e.g., transmission through the Internet). In addition, the computer-readable recording medium may be distributed over network-connected computer systems so that computer readable codes may be stored and executed in a distributed manner. In addition, functional programs, codes, and code segments for implementing the embodiments may be easily construed by programmers skilled in the art to which the present disclosure pertains.

It will be understood to those skilled in the art that various modifications, which have not been illustrated above, can be made to the above-described exemplary embodiments of the present invention without departing from the spirit or scope of the invention. Accordingly, the embodiments as described above are to be regarded as illustrative rather than restrictive.

What is claimed is:

1. An apparatus for training a facial-locality super resolution deep neural network, the apparatus comprising:
a generator circuitry configured to receive a synthetic low-resolution image and convert the received synthetic image into a fake high-resolution image similar to an original high-resolution image;
a discriminator circuitry configured to compare the fake high-resolution image output from the generator circuitry with the original high-resolution image to determine authenticity; and
a facial-locality loss term calculator circuitry configured to calculate a loss that is to be minimized by the generator circuitry according to the authenticity output from the discriminator circuitry,
wherein the generator circuitry is an artificial neural network learning model that learns while adjusting a weight to minimize the loss, and
the facial-locality loss term calculator circuitry is further configured to determine that a feature region of a face exists, and, if it is determined that the feature region exits, calculate the loss of the generator circuitry by additionally adding a facial-locality loss of the feature region of the face.

2. The apparatus of claim 1, further comprising a plurality of training data generator circuitries that are cascaded and configured to generate training images that are down-sampled from the original high-resolution image by $½^n$ times (n is an integer from 1 to m),
wherein each of the training data generator circuitry is configured to:
input a training image down-sampled by $½^m$ times to a first generator as a low-resolution image; and
input a training image down-sampled by $½^{m-n}$ times to an $n^{th}$ discriminator circuitry as a high-resolution image.

3. The apparatus of claim 2, wherein the training data generator circuitry uses average pooling and a random sigma Gaussian filter.

4. The apparatus of claim 1, wherein the facial-locality loss term calculator circuitry reflects, in a loss of the generator circuitry, $L_{vgg}ij$ that refers to a $j^{th}$ layer of an $i^{th}$ block of a visual geometry group (VGG) network, wherein (i, j) is at least one of (2, 2), (4, 4), and (5, 4).

5. The apparatus of claim 1, wherein the facial-locality loss term calculator circuitry is configured to:
calculate a gradient loss that is a value corresponding to a norm of differences between lateral direction pixels, diagonal direction pixels, and longitudinal direction pixels at each pixel of an image and obtained by performing a root mean square on instantaneous gradient values of pixels of the image; and
reflect the gradient loss in the loss of the generator circuitry.

6. A method of training a facial-locality super resolution deep neural network, the method comprising:
receiving a synthetic low-resolution image and converting the received synthetic image into a fake high-resolution image similar to an original high-resolution image;
comparing the fake high-resolution image with the original high-resolution image to determine authenticity; and
calculating a loss, which is to be minimized in the converting, according to the authenticity,
wherein the converting includes learning while adjusting a weight of an artificial neural network model to minimize the loss, and
the calculating includes determining that a feature region of a face exists, and if it is determined that the feature region exists, calculating the loss by additionally adding a facial-locality loss of the feature region of the face.

7. A method of training a facial-locality super resolution deep neural network, the method comprising:
generating training images that are down-sampled from an original high-resolution image by $\frac{1}{2}^n$ times (n is an integer from 1 to m);
setting a current stage (n) to a first stage and converting a training image down-sampled by $\frac{1}{2}^m$ times into a low-resolution image to generate a first fake high-resolution image;
discriminating between a high-resolution image and a $n^{th}$ high-resolution image, which is obtained from a training image down-sampled by $\frac{1}{2}^{m-n}$ times, to determine an authenticity;
calculating a loss according to a result of the determination of the authenticity;
relearning while updating a weight in a backpropagation method to minimize a loss of an artificial neural network learning model used in the generating according to the calculated loss;
determining whether the current stage (n) coincides with m; and
updating n to n+1 when the current stage (n) does not coincide with m, converting a fake high-resolution image generated in an $n-1^{th}$ stage to generate an $n^{th}$ stage fake high-resolution image, and sequentially repeating the discriminating, the calculating, the relearning, and the determining,
wherein the calculating includes determining that a feature region of a face exists, and if it is determined that the feature region exists, calculating the loss by additionally adding a facial-locality loss of the feature region of the face.

8. The apparatus of claim 2, wherein the facial-locality loss term calculator circuitry reflects, in a loss of the generator circuitry, $L_{vgg}ij$ that refers to a $j^{th}$ layer of an $i^{th}$ block of a visual geometry group (VGG) network, wherein (i, j) is at least one of (2, 2), (4, 4), and (5, 4).

9. The apparatus of claim 2, wherein the facial-locality loss term calculator circuitry is configured to:
calculate a gradient loss that is a value corresponding to a norm of differences between lateral direction pixels, diagonal direction pixels, and longitudinal direction pixels at each pixel of an image and obtained by performing a root mean square on instantaneous gradient values of pixels of the image; and
reflect the gradient loss in the loss of the generator circuitry.

* * * * *